US011092192B2

(12) United States Patent
Omori

(10) Patent No.: US 11,092,192 B2
(45) Date of Patent: Aug. 17, 2021

(54) RADIAL FOIL BEARING

(71) Applicant: IHI CORPORATION, Tokyo (JP)

(72) Inventor: Naomichi Omori, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 16/727,022

(22) Filed: Dec. 26, 2019

(65) Prior Publication Data

US 2020/0224713 A1 Jul. 16, 2020

Related U.S. Application Data

(63) Continuation of application No. PCT/JP2018/024343, filed on Jun. 27, 2018.

(30) Foreign Application Priority Data

Jun. 27, 2017 (JP) ............................ JP2017-124795

(51) Int. Cl.
*F16C 17/02* (2006.01)
*F16C 27/02* (2006.01)
*F16C 43/02* (2006.01)

(52) U.S. Cl.
CPC ............ *F16C 17/024* (2013.01); *F16C 27/02* (2013.01); *F16C 43/02* (2013.01); *F16C 2226/76* (2013.01); *F16C 2360/23* (2013.01)

(58) Field of Classification Search
CPC ......... F16C 17/024; F16C 27/02; F16C 43/02
See application file for complete search history.

(56) References Cited

U.S. PATENT DOCUMENTS 5,915,841 A 6/1999 Weissert
9,551,375 B2 * 1/2017 Omori .................. F16C 17/024
9,568,042 B2 * 2/2017 Omori .................... F16C 27/02
9,915,286 B2 * 3/2018 Omori .................... F16C 27/02
2004/0179759 A1 9/2004 Katou et al.
2005/0185865 A1 8/2005 Agrawal
2010/0177997 A1 7/2010 Lee
2011/0103725 A1 5/2011 Omori
2015/0292552 A1 10/2015 Thompson et al.
2015/0362012 A1 12/2015 Ermilov
2016/0348714 A1 12/2016 Omori

FOREIGN PATENT DOCUMENTS

CA 747800 A 12/1966
CN 105041870 A 11/2015
CN 105980718 A 9/2016
EP 2 778 448 A1 9/2014
EP 2 876 316 A1 5/2015

(Continued)

OTHER PUBLICATIONS 560032, dated Dec. 10, 2010, Bruckner R. J., et al.

*Primary Examiner* — James Pilkington

(57) ABSTRACT

The radial foil bearing includes: a housing provided with an insertion hole; a back foil disposed on an inner peripheral surface of the insertion hole, a notch being provided at an edge of the hack foil in an axial direction in which the insertion hole extends; and an engagement member attached to the housing in a state of passing through the notch and extending to outside of a formation area of the notch in a circumferential direction of the insertion hole on an inner peripheral side of the back foil.

5 Claims, 10 Drawing Sheets

(56) References Cited

FOREIGN PATENT DOCUMENTS

| | | | |
|---|---|---|---|
| EP | 2 886 888 | A1 | 6/2015 |
| JP | H11-247844 | A | 9/1999 |
| JP | 2004-270904 | A | 9/2004 |
| JP | 2005-233427 | A | 9/2005 |
| JP | 2006-057652 | A | 3/2006 |
| JP | 2009-299748 | A | 12/2009 |
| JP | 2010-529390 | A | 8/2010 |
| JP | 2013-100885 | A | 5/2013 |
| JP | 2014-020463 | A | 2/2014 |
| JP | 2014-037857 | A | 2/2014 |
| KR | 10-1534639 | B1 | 7/2015 |
| WO | 2008/153226 | A1 | 12/2008 |
| WO | 2012/127998 | A1 | 9/2012 |

* cited by examiner (a)

(b)

(c)

RADIAL FOIL BEARING

CROSS-REFERENCE TO RELATED APPLICATIONS

This application is a Continuation Application based on International Application No. PCT/JP2018/024343, filed Jun. 27, 2018, which claims priority on Japanese Patent Application No. 2017-124795, filed Jun. 27, 2017, the contents of which are incorporated herein by reference.

TECHNICAL FIELD

The present disclosure relates to a radial foil bearing.

BACKGROUND

Conventionally, as a bearing for a high-speed rotating body, a radial foil bearing to be used encircling a rotary shaft is known. As such a radial foil bearing, a configuration is well known including a thin sheet-shaped top foil that forms a bearing surface, a back foil that elastically supports the lop foil, and a cylindrical housing that accommodates the top foil and the back foil. As the back foil of the radial foil bearing, for example, a bump foil obtained by forming a thin sheet into wave-sheet shape is used.

In such a radial foil bearing, for example, welding spot welding) may be used in order to prevent the back foil from detaching from the housing. However, when using, welding (spot welding), the back foil and the bearing housing may be deformed. As a result, the top foil may be distorted, which may affect the load capacity and the dynamic characteristics (rigidity and damping performance) of the bearing, and a sufficient support capacity may not be obtained. Therefore, in the radial foil beating of Patent Document 1 described below, engagement protrusions are provided at ends on two sides in the axial direction on the inner peripheral surface of the housing, engagement notches are provided at peripheral edges on two sides of the back foil, and the engagement protrusions and the engagement notches are engaged with each other, whereby the back foil is prevented from detaching from the housing.

The radial foil bearing is also disclosed in the following Patent Documents 2 to 4.

Document of Related Art

Patent Document

[Patent Document 1] Japanese Unexamined Patent Application, First Publication No. 2013-100885

[Patent Document 2] Japanese Unexamined Patent Application, First Publication No. 2014-20463

[Patent Document 3] Japanese Unexamined Patent Application, First Publication No. 2014-37857

[Patent Document 4] Published Japanese Translation No. 2010-529390 of the PCT International Publication No. WO 2008/153226

SUMMARY

Technical Problem

Incidentally, when the rotary shaft is inserted through the housing, the back foil is pressed from above (from inside in the radial direction) by the top foil. However, before the rotary shaft is inserted through the housing, this pressing force is weak, and thus the engagement notch of the back foil may be disengaged from the engagement protrusion of the housing.

The present disclosure was made in view of the above problems, and an object thereof is to prevent the back toil from detaching from the housing.

Solution to Problem

In order to solve the above problems, a radial foil bearing of an aspect of the present disclosure includes: a housing provided with an insertion hole; a hack foil disposed on an inner peripheral surface of the insertion hole, a notch being provided at edge of the back foil in an axial direction in which the insertion hole extends; and an engagement member attached to the housing in a state of passing through the notch and extending to outside of a formation area of the notch in a circumferential direction of the insertion hole on an inner peripheral side of the back foil.

In the radial foil bearing of the above aspect of the present disclosure, the engagement member may extend toward two sides in the circumferential direction of the formation area of the notch on the inner peripheral side of the back foil.

The radial foil bearing of the above aspect of the present disclosure may include an intermediate foil supported by the back foil, a second notch being provided at an edge of the intermediate foil in the axial direction, wherein the engagement member may be attached to the housing in a state of passing through the notch and the second notch and may extend to outside of a formation area of the second notch in the circumferential direction of the insertion hole on an inner peripheral side of the intermediate foil.

In the radial foil bearing of the above aspect of the present disclosure, an engagement groove extending outward in a radial direction from an inner peripheral edge of the insertion hole may be provided on an end surface in the axial direction of the housing, and the engagement member may contact an inner surface of the engagement groove.

In the radial foil bearing of the above aspect of the present disclosure, the engagement member may contact the inner surface of the engagement groove in an accumulated state.

The radial foil bearing of the above aspect of the present disclosure may include a cover attached to the end surface in the axial direction of the housing and covering the engagement groove accommodating the engagement member.

Effects

According to the present disclosure, the back foil can be prevented from detaching from the housing.

DESCRIPTION OF EMBODIMENTS

Hereinafter, radial foil bearings of the present disclosure will be described in detail with reference to the drawings.

Figure 1:
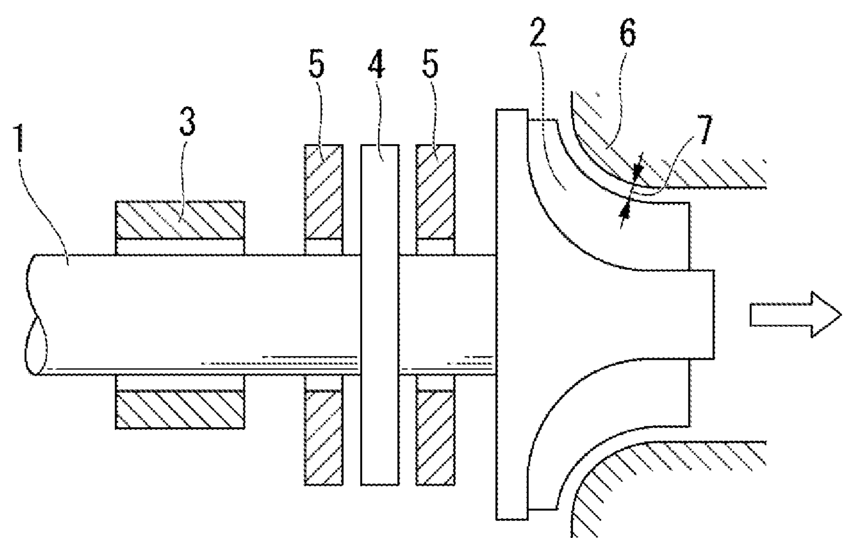
FIG. 1 is a side view showing an example of a turbo machine to which a radial foil hearing of the present disclosure is applied.

FIG. 1 is a side view showing an example of a turbo machine to which a radial foil bearing of the present disclosure is applied.

In FIG. 1, the reference sign 1 represents a rotary shaft, the reference sign 2 represents an impeller provided at the end on one side in the axial direction of the rotary shaft, and the reference sign 3 represents a radial foil bearing of the present disclosure. Note that FIG. 1 shows only one radial foil bearing by omission, but two radial foil bearings are usually provided in the axial direction of the rotary shaft 1. Therefore, two radial foil bearings 3 are also provided in this embodiment.

The radial foil bearing 3 is provided on the rotary shaft 1 so as to encircle the rotary shaft 1. That is, the rotary shaft 1 is inserted through the radial foil bearing 3. A thrust collar 4 is provided between the impeller 2 and the radial foil bearing 3 of the rotary shaft 1. A thrust bearing 5 is disposed (inserted) on each of both sides in the axial direction of the thrust collar 4. The impeller 2 is disposed inside a housing 6 that is the stationary side, and a tip clearance 7 is provided between the impeller 2 and the housing 6.

Figure 2:
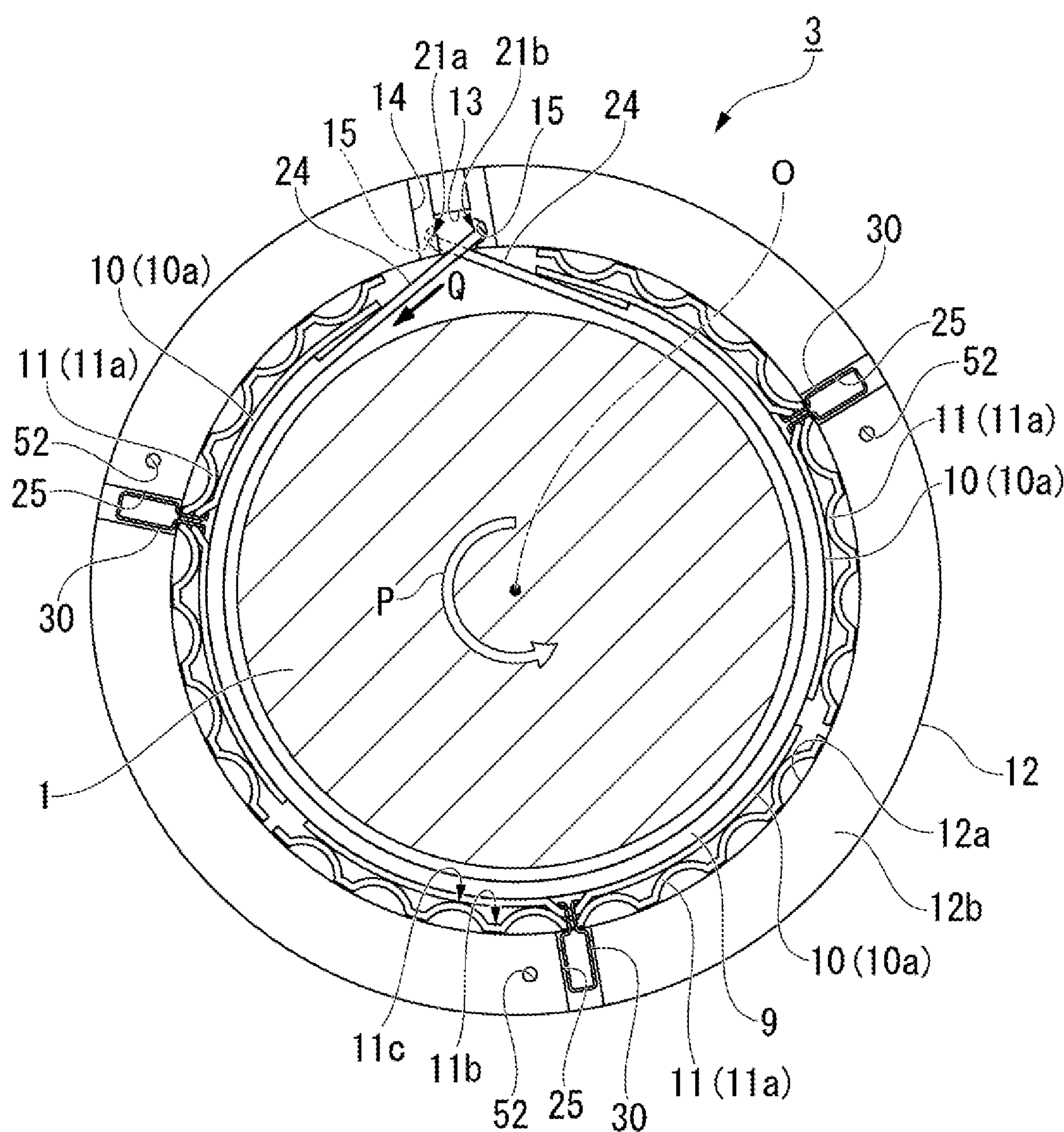
FIG. 2 is a front view showing the radial foil bearing of the present disclosure.
Figure 3:
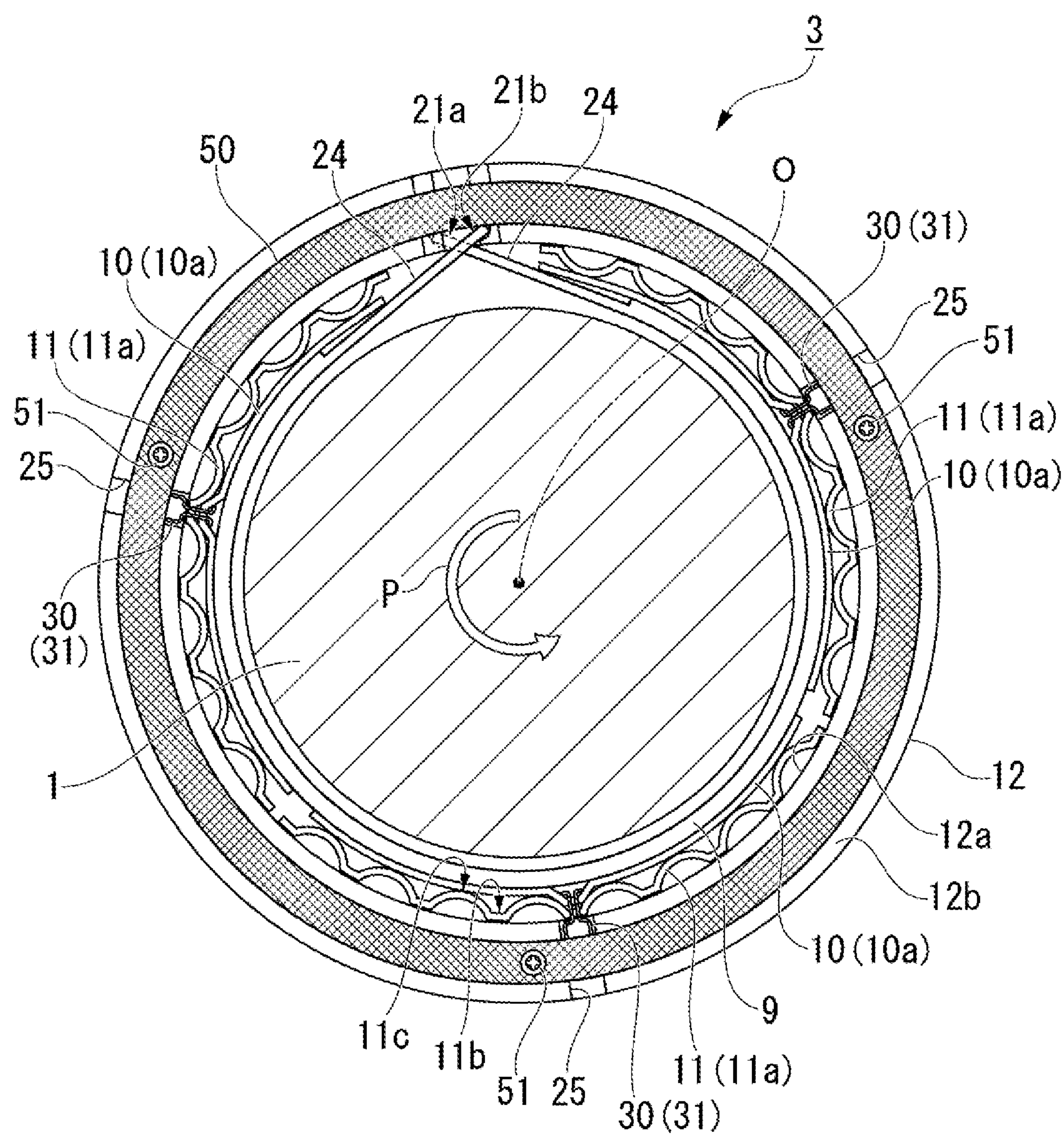
FIG. 3 is a front view showing a state where the radial foil hearing of the present disclosure is attached with a cover.

FIG. 2 is a front view showing the radial foil bearing 3 of the present disclosure. FIG. 3 is a front view showing a state where the radial foil bearing 3 of the present disclosure is attached with a cover 50.

The radial foil bearing 3 is a bearing that is provided encircling the rotary shaft 1 and that supports the rotary shaft 1. The radial foil bearing 3 includes a top foil 9, an intermediate foil 10, a back foil 11 and a bearing housing 12 (housing). The bearing housing 12 is provided with an insertion hole 12*a* through which the rotary shaft 1 is inserted. Note that the hearing housing 12 provided with the insertion hole 12*a* of the present disclosure has a cylindrical shape.

In the following description the positional relationships between members may be described based on the insertion hole 12*a*. Specifically, the "axial direction" refers to the direction in which the insertion hole 12*a* extends (the direction in which the rotary shaft 1 is inserted). A "radial direction" refers to the radial direction of the insertion hole 12*a* (namely, a direction orthogonal to an central axis (see the reference sign O in FIGS. 2 and 3) of the insertion hole 12*a*). A "circumferential direction" refers to the circumferential direction along the inner peripheral surface of the insertion hole 12*a* (namely, the direction around the central axis of the insertion hole 12*a*).

The bearing housing 12 is a cylindrical member that configures the outermost part in the radial direction of the radial foil bearing 3. The back foil 11, the intermediate foil 10 and the top foil 9 are accommodated in the insertion hole 12*a* of the healing housing 12. Specifically, the back foil 11 is supported by the inner peripheral surface of the insertion hole 12*a*, the intermediate foil 10 is supported by the back foil 11, and the top foil 9 is supported by the intermediate foil 10. Note that the bearing housing 12 of the present disclosure is a cylindrical member including the insertion hole 12*a*. However, the bearing housing 12 may be a member other than a cylinder (for example, a square pillar) as long as the bearing housing 12 is provided with the insertion hole 12*a*.

Figure 4:
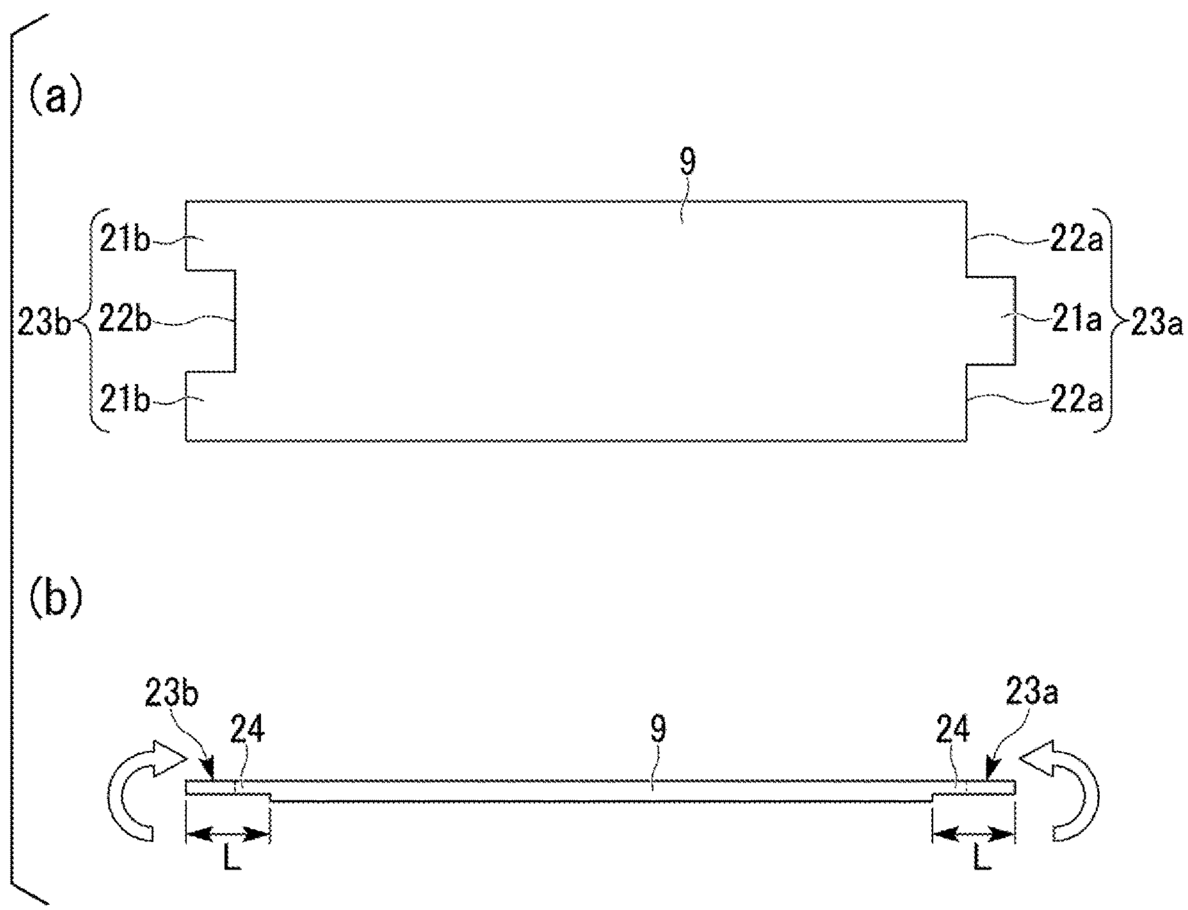
FIG. 4 is a schematic view in which a top foil of the present disclosure is developed, the part (a) thereof is a plan view, and the part (b) thereof is a front view.

FIG. 4 is a schematic view in which the top foil 9 of the present disclosure is developed, the part (a) thereof is a plan view, and the part (b) thereof is a front view. As shown in the part (a) of FIG. 4, the top foil 9 is a substantially rectangular metal foil having long sides that are in the circumferential direction and short sides that are in the axial direction. The top foil 9 is rolled in a cylindrical shape as shown in FIG. 2 and is disposed facing the outer peripheral surface of the rotary shaft 1.

As shown in the part (a) of FIG. 4, one short side in the long-side direction of the top foil. 9 is provided with a first uneven portion 23*a* that includes one protruding part. 21*a* protruding to one side in the long-side direction, and two recessed parts 22*a* formed on both sides in the short-side direction of the protruding part 21*a*. That is, one short side in the long-side direction of the top foil 9 includes one protruding part 21*a* protruding in the long-side direction and steps extending to both sides in the short-side direction of the protruding part 21*a*.

The other short side (the Short side positioned on the other side in the long-side direction) on the opposite side from the one short side of the top foil 9 is provided with a second uneven portion 23*b* that includes two protruding parts 21*b* apart from each other in the short-side direction, and one recessed part 22*b* positioned between the two protruding parts 21*b*. In other words, the short side positioned on the other side in the long-side direction of the top foil 9 includes the recessed part 22*b* depressed toward the one side in the long-side direction, and steps positioned on both sides in the short-side direction of the recessed part 22*b*.

The recessed part 22*b* of the second uneven portion 23*b* is formed corresponding to the protruding part 21*a* of the first uneven portion 23*a*. The recessed parts 22*a* of the first uneven portion 23*a* are formed corresponding to the protruding parts 21*b* of the second uneven portion 23*b*. That is, the minimum value of the space in the short-side direction of the recessed part 22*b* is greater than the maximum value of the width in the short-side direction of the protruding part 21*a*. The length (depression depth) in the long-side direction of the recessed part 22*b* of the present disclosure and the length in the long-side direction of the protruding part 21*a* are constant in the long-side direction.

The recessed part 22*b* of the second uneven portion 23*b* is formed such that the protruding part 21*a* passes through the recessed part 22*b* when the top foil 9 is rolled into a cylindrical shape such that the first uneven portion 23*a* and the second uneven portion 23*b* overlap each other. Similarly, the recessed parts 22*a* of the first uneven portion 23*a* are formed such that the protruding parts 21*b* pass through the recessed parts 22*a* when the top foil 9 is rolled into a cylindrical shape.

As shown in FIG. 2, the protruding parts 21*a* and 21*b* passed through the recessed parts 22*b* and 22*a*, respectively, are pulled out toward the bearing housing 12 (outward in the radial direction). That is, when the top foil 9 disposed on the inner peripheral side (namely, on the inner side in the radial direction) of the insertion hole 12*a* is viewed the axial direction, the protruding part 21*a* and the protruding part 21*b* intersect each other. The protruding part 21*a* of the top foil 9 is positioned between the two protruding parts 21*b* in the axial direction. In the bearing housing 12, the inner peripheral surface of the insertion hole 12*a* is provided with a first groove 13 that is continuous from one end surface 12*b* to the other end surface 12*b* in the axial direction.

Figure 5:
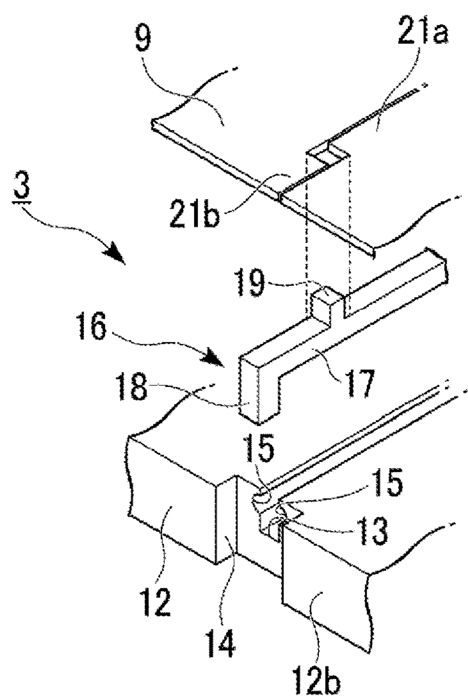
FIG. 5 is a schematic view of the main part of a first groove of the bearing housing of the present disclosure, the part (a) thereof is an exploded perspective view, the part (b) thereof is a plan view, and the pan. (c) thereof is a cross-sectional view.
Figure 5:
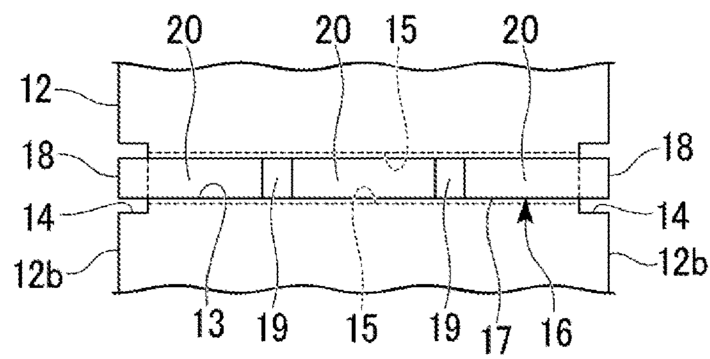
Figure 5:
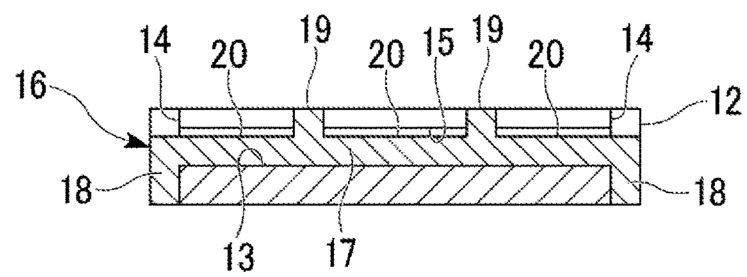

FIG. 5 is a schematic view of the main part of the first groove 13 of the bearing housing 12 of the present disclosure, the part (a) thereof is an exploded perspective view, the part (b) thereof is a plan view, and the part (c) thereof is a cross-sectional view.

In the bearing housing 12, as shown in the parts (a) and (b) of FIG. 5, second grooves 14 communicating with two ends of the first groove 13 are formed. The second groove 14 is formed on each of two end surfaces 12*b* in the axial direction of the hearing housing 12 and extends outward in the radial direction from the inner peripheral edge of the bearing, housing 12.

A third groove 15 is formed on each of inner surfaces of the first groove 13 facing each other in the circumferential direction. The third groove 15 is formed on the entire length of the first groove 13. The cross-sectional shape of the third groove 15 has a U-shape (semi-circular arc shape). The third groove 15 is formed at the opening end in the radial direction of the first groove 13, namely, at a position deeper than (outward in the radial direction relative to) the inner peripheral surface (the insertion hole 12*a*) of the bearing housing 12. As shown in FIG. 2, the protruding parts 21*a* and 21*b* passed through the recessed pans 22*b* and 22*a* are inserted into the third grooves 15.

As shown in the part (a) of FIG. 5, an insertion tool 16 is fitted into the first groove 13 and the second groove 14. As shown in the parts (a) to (c) of FIG. 5, the insertion tool 16 includes a bar-shaped (square pillar-shaped) base 17 accommodated in the first groove 13, a pair of bent parts 18 provided in the base 17 and engaging in the second grooves 14, and two partition parts 19 provided in the base 17 and protruding in the opposite direction in the radial direction from a direction in which the bent pans 18 extend.

The base 17 is accommodated in the first groove 13 in a state where the upper surface (the surface on the partition part 19-side) of the base 17 is positioned slightly below the opening of the first groove 13 (where the upper surface is positioned outward in the radial direction). The bent part 18 contacts the bottom surface of the second groove 14 in the axial direction. Further, the bent part 18 does not protrude from the outer peripheral surface of the bearing housing 12 in the radial direction. The bent parts 18 contact two sides in the axial direction of the bearing housing 12 and thereby prevent the movement of the insertion tool 16 in the axial direction.

As shown in the parts (b) and (c) of FIG. 5, the partition part 19 is provided at each of two positions that divide the base. 17 into substantially three equal portions in the axial direction. As shown in the part (c) of FIG. 5, the partition part 19 has the same height as the opening position of the first groove 13 or has a height such that the partition part 19 slightly protrudes from the opening position of the first groove 13. The partition parts 19 divide the upper surface of the base 17 into substantially three to form three engagement grooves 20 in the axial direction.

The protruding parts 21*a* and 21*b* passed through the recessed parts 22*b* and 22*a* engage in the three engagement grooves 20. As shown in FIG. 2, the distal ends thereof are inserted into the third grooves 15. The protruding parts 21*a* and 21*b* are inserted into the third grooves 15, whereby the movement (rotation) of the top foil 9 in the circumferential direction is prevented. Thai is, two ends in the circumferential direction of the top foil 9 contact the bearing housing 12 or a member attached to the beating housing 12. As a result, drag acts on two ends in the circumferential direction of the top foil 9.

The top foil 9 approaches the insertion hole 12*a* of the hearing housing 12 in a wedge shape (inclined state being in the tangential direction of the top foil 9 rolled in a cylindrical shape) as it goes to two ends of the top foil 9 in the circumferential direction. In other words, the separation between the top foil 9 and the inner peripheral surface of the insertion hole 12*a* gradually decreases toward each of the two ends in the circumferential direction of the top foil 9. Similarly, the top foil 9 approaches the intermediate foil 10 in a wedge shape as it goes to each the two ends thereof in the circumferential direction. In other words, the separation between the top foil 9 and the intermediate foil 10 gradually decreases toward each of the two ends in the circumferential direction of the top foil 9. In addition, the protruding parts 21*a* and 21*b* engage in the engagement grooves 20, whereby the movement of the top foil 9 in the axial direction is prevented.

In this embodiment, the first uneven portion 23*a* and the second uneven portion 23*b* described above are provided in the top foil 9, but the present disclosure is not limited to this configuration. Two ends in the circumferential direction of the top foil may be provided with a first uneven portion and a second uneven portion, the first uneven portion may include at least one protruding part and at least one recessed part, the second uneven portion may include at least one protruding part and at least one recessed part, and in a state where the top foil is rolled in a cylindrical shape such that the first uneven portion and the second uneven portion overlap each other, the protruding part of the first uneven portion may pass through the recessed part of the second uneven portion, and the protruding part of the second uneven portion may pass through the recessed part of the first uneven portion. In this case, the structures of the first groove 13 and the insertion tool 16 may be appropriately changed according to the numbers of the protruding parts and the recessed parts provided in the first uneven portion and the second uneven portion. Further, the numbers of the protruding parts and the recessed parts provided in the first uneven portion and the second uneven portion may be greater than the numbers in this embodiment. For example, the first uneven portion may include two protruding parts and three recessed parts, and the second uneven portion may include three protruding parts and two recessed parts.

The two third grooves 15 are provided in the first groove 13 of this embodiment, but the present disclosure is not limited to this configuration, and other configurations may be used. For example, instead of the third grooves 15, protrusions for locking two ends in the circumferential direction of the top foil may be provided at the opening end of the first groove 13.

Returning to the part (b) of FIG. 4, the top foil 9 is provided with thin portions 24 at a side (one short side) on which the first uneven portion 23*a* is provided and another side (the other short side) on which the second uneven portion 23*b* is provided, and the thin portions 24 are thinner (have thinner thickness) than the central portion between the sides. As shown in FIG. 2, the thin portions 24 are formed to be thin such that the outer peripheral surfaces thereof (the surfaces on the bearing housing 12-side) are depressed relative to the outer peripheral surface of the central portion. As shown in FIG. 2, the length L in the circumferential direction of the thin portion 24 is a length corresponding to the sum of the first groove 13 and one hill part 11*c* at the end portion of the back foil 11. In the present disclosure, the top foil 9 disposed in the hearing housing 12 includes steps on the outer peripheral side thereof and becomes thin via the steps. The thin portions 24 extend to positions in the circumferential direction beyond the hill parts 11*c* closest to the two ends in the circumferential direction of the top foil 9.

As shown in FIG. 2, pairs of engagement grooves 25 extending outward in the radial direction from the inner peripheral edge (inner peripheral surface) of the insertion hole 12*a* are provided on the two end surfaces 12*b* in the axial direction of the hearing housing 12. That is, the end surface 12*b* in the axial direction of the bearing housing 12 is provided with recesses extending to the inner peripheral surface of the hearing housing 12. The engagement groove 25 of the present disclosure is formed at each of positions that divide the end surface 12*b* of the bearing housing 12 into substantially three in the circumferential direction. The engagement groove 25 is engaged with an engagement member 30 (engagement pin, described later). In this embodiment, the first groove 13 is disposed between two pairs of engagement grooves 25 among three pairs of engagement grooves 25. A pair of engagement grooves 25 face the first groove 13 in the radial direction.

The engagement groove 25 of this embodiment is formed from the inner peripheral edge (inner peripheral surface) of the insertion hole 12*a* to the outer peripheral edge (outer peripheral surface) of the bearing housing 12, but the present disclosure is not limited thereto. For example, the engagement groove may be formed from the inner peripheral edge (inner peripheral surface) of the insertion hole 12*a* to an intermediate position in the thickness direction (the radial direction) of a plate member configuring the bearing housing 12. That is, the engagement groove may not reach the outer peripheral edge of the bearing housing 12.

The back foil 11 is disposed on the inner peripheral surface of the insertion hole 12*a* of the bearing housing 12. The back foil 11 is a foil (thin sheet) that elastically supports the intermediate foil 10 and the top foil 9. For the back foil 11, for example, a bump foil, a spring foil disclosed in Japanese Unexamined Patent Application, First Publication No. 2006-57652, Japanese Unexamined Patent Application, First Publication No. 2004-270904 or the like, or a back foil disclosed in Japanese Unexamined Patent Application, First Publication No. 2009-299748 or the like is used. In this embodiment, a bump foil is used for the back foil 11.

The back foil 11 of the present disclosure is configured of three (a plurality of) back foil pieces 11*a* disposed along the inner peripheral surface of the insertion hole 12*a*. The back foil piece 11*a* is that a foil (thin sheet) is formed in a wave-sheet shape in the circumferential direction. The three back foil pieces 11*a* are curved so as to be substantially cylindrical as a whole when viewed in the axial direction. That is, the back foil pieces 11*a* are supported by the inner peripheral surface of the insertion hole 12*a*. In the present disclosure, all of the three back foil pieces 11*a* are formed in equal shape and dimensions. Thus, the back foil pieces 11*a* are arranged so as to divide the inner peripheral surface of the insertion hole 12*a* into substantially three in the circumferential direction.

In the back foil piece 11*a*, hill parts 11*c* protruding inward in the radial direction and valley parts 11*b* protruding outward in the radial direction when viewed from the hill parts 11*c* are alternately formed in the circumferential direction. The valley part 11*b* includes a flat part facing the bearing housing 12, and the flat part can contact the inner peripheral surface of the insertion hole 12*a*. The hill part 11*c* can contact the intermediate foil 10 (an intermediate foil piece 10*a*). In this way, the back foil piece 11*a* elastically supports the top foil 9 by the hill parts 11*c* via the intermediate foil piece 10*a*. Two ends of the back foil piece 11*a* in the circumferential direction are each formed to be the valley part 11*b*.

Figure 6:
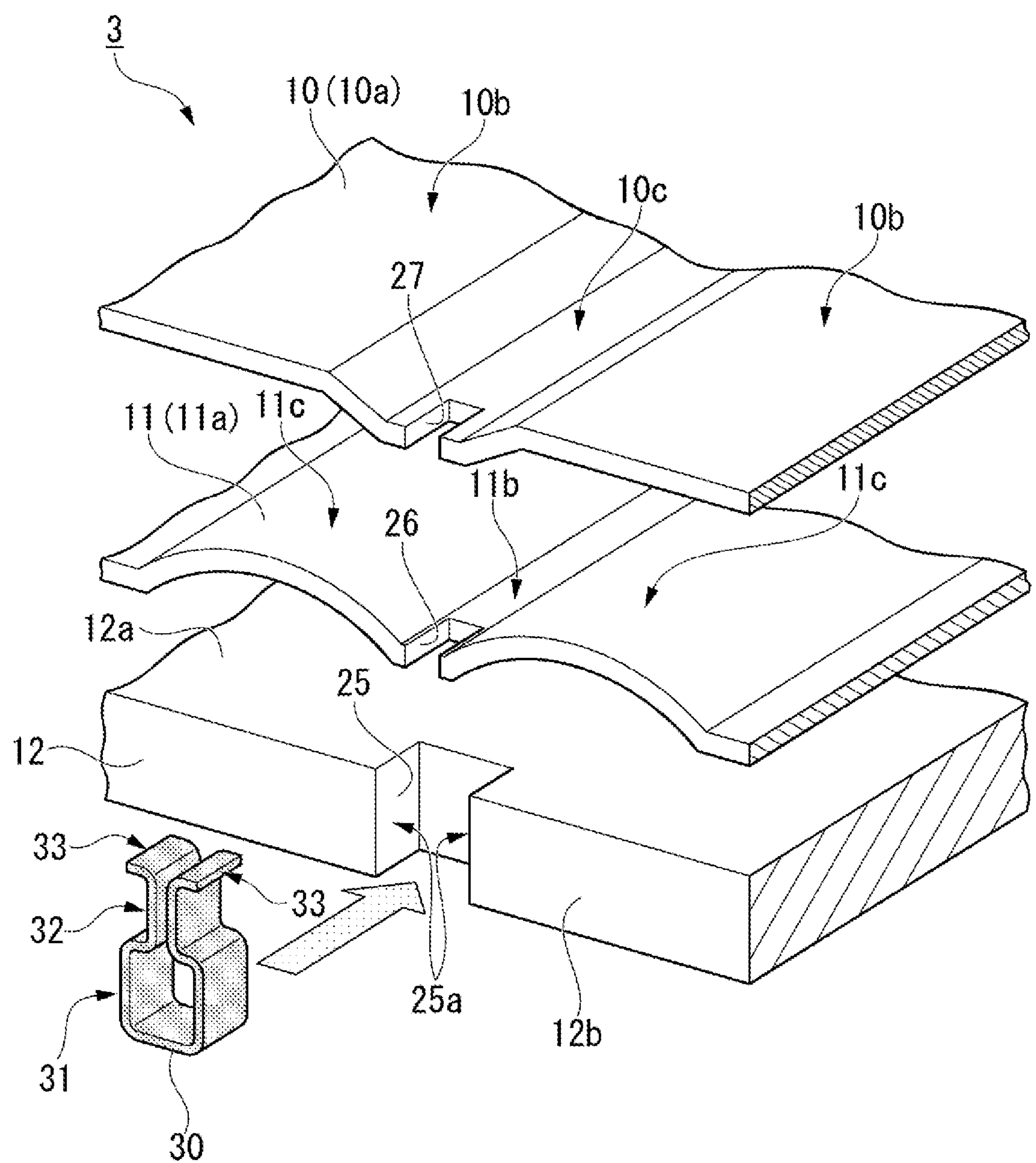
FIG. 6 is an enlarged perspective view of the main part of the radial foil bearing of the present disclosure.
Figure 7:
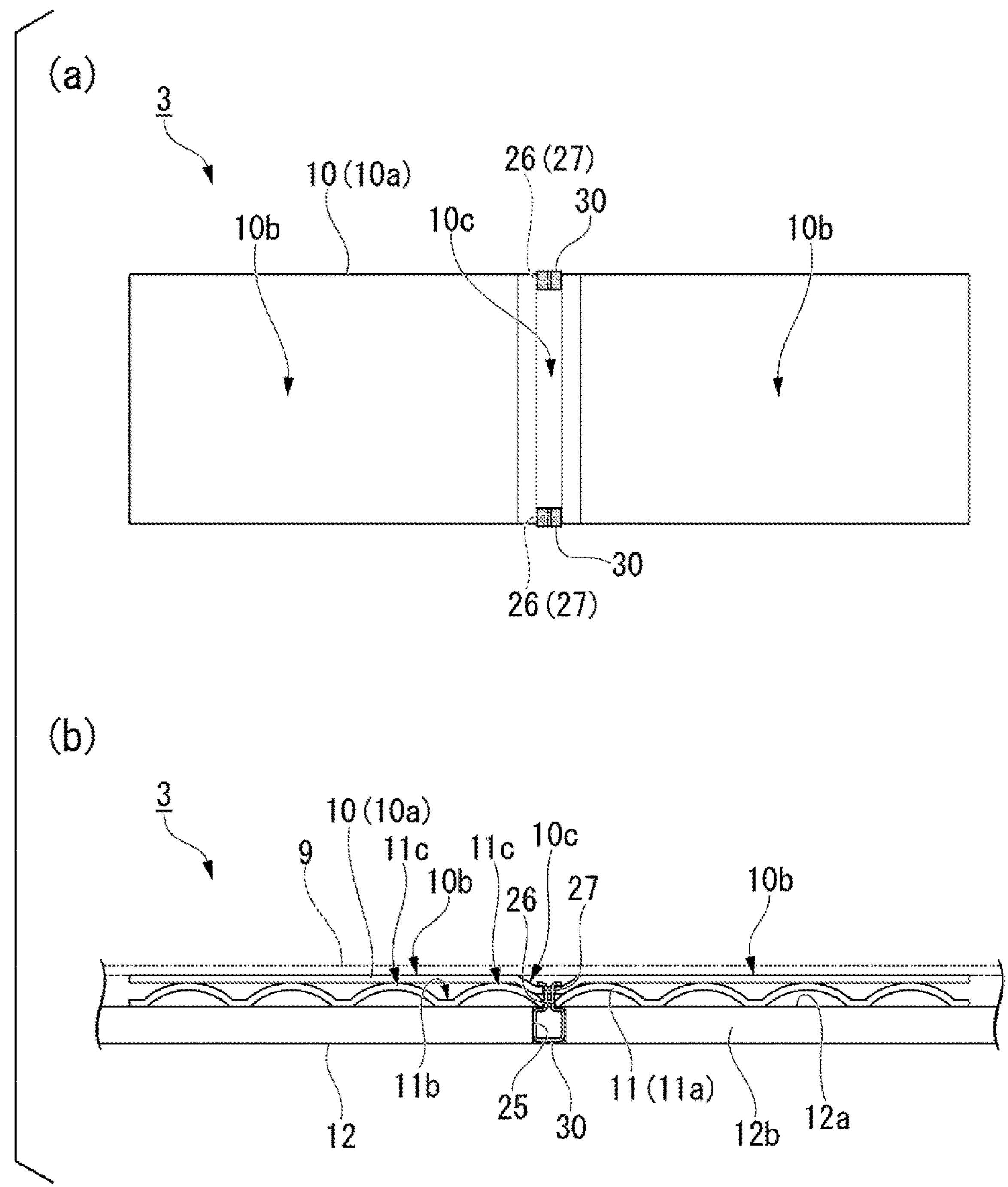
FIG. 7 is a schematic view in which the main part of the radial foil bearing of the present disclosure is flattened, the part (a) thereof is a plan view, and the part (b) thereof is a front view.

FIG. 6 is an enlarged perspective view of the main part of the radial foil bearing 3 of the present disclosure. FIG. 7 is a schematic view in which the main part of the radial foil bearing 3 of the present disclosure is flattened, the part (a) thereof is a plan view, and the part (b) thereof is a front view.

As shown in FIG. 6 and the part (a) of FIG. 7, the hack foil piece 11*a* includes notches 26 at edges of two ends thereof in the axial direction. These notches 26 are provided in the valley part 11*b* of the back foil piece 11*a*.

The notch 26 is formed at a position in the circumferential direction between two ends of the back foil piece 11*a* in the circumferential direction (in the present disclosure, at a center position of the hack foil piece 11*a* in the circumferential direction). That is, the edges of two ends in the axial direction of the back foil piece 11*a* are each provided with a depression in the axial direction at the above position in the circumferential direction. As shown in FIG. 6, the notch 26 is disposed at a position corresponding to the engagement groove 25 of the bearing housing 12, namely, at a position overlapping the engagement groove 25. In other words, the notch 26 is disposed at an equivalent position to the engagement groove 25 in the axial direction and the circumferential direction. The width of the notch 26 (the width in the circumferential direction) is formed to lie less than the width of the engagement groove 25 (the width in the circumferential direction). That is, two ends in the circumferential direction of the notch 26 are positioned at positions in the circumferential direction between two ends in the circumferential direction of the engagement groove 25.

Returning to FIG. 2, the intermediate foil 10 is disposed between the top foil 9 and the back foil 11. In the present disclosure, the intermediate foil 10 is configured of three intermediate foil pieces 10*a* disposed along the inner peripheral surface of the insertion hole 12*a*. As shown in the part (a) of FIG. 7, the intermediate foil piece 10*a* is formed such that the developed shape thereof is a substantially rectangular shape. The three intermediate foil pieces 10*a* are curved so as to be a substantially cylindrical shape as a whole as shown in FIG. 2 when viewed in the axial direction. In the present disclosure, all of the three intermediate foil pieces 10*a* are formed in equal shape and dimensions. Therefore, the intermediate foil pieces 10*a* are disposed so as to divide the inner peripheral surface of the insertion hole 12*a* into substantially three in the circumferential direction.

As shown in the part (a) of FIG. 7, the external shape of the intermediate foil piece 10*a* has a size substantially equal to the external shape of the back foil piece 11*a*. As shown in the part (b) of FIG. 7, the intermediate foil piece 10*a* includes flat portions 10*b* contacting the peaks of the hill parts 11*c* of the back foil 11, and a recess 10*c* recessed (protruding) outward in the radial direction relative to the flat portions 10*b*. That is, the recess 10*c* is apart from the top foil 9. As shown in the part (a) of FIG. 7 the recess 10*c* is formed at a position in the circumferential direction between two ends in the circumferential direction of the intermediate foil piece 10*a* (in the present disclosure, at a center position of the intermediate foil piece 10*a* in the circumferential direction).

The recess 10*c* of the present disclosure includes a bottom portion positioned outward in the radial direction relative to the flat portions 10*b* and being flat in the circumferential direction, and tapered portions positioned at both ends in the circumferential direction of the bottom portion and extending inward in the radial direction toward the flat portions 10*b*. The separation between the pair of tapered portions increases inward from outside in the radial direction. As shown in FIG. 6, the width in the circumferential direction of the bottom portion of the recess 10*c* is greater than the width in the circumferential direction of the flat part of the valley part 11*b* of the back foil piece 11*a*. Note that in a case where both of the hill part 11*c* and the valley part 11*b* are formed in cycles so as to each have one peak, the width in the circumferential direction of the valley part 11*b* of the present disclosure is the less one of the length in the circumferential direction of the hill part 11*c* and the length in the circumferential direction of the valley part 11*b* of the back toil piece 11*a* at an intermediate position in the radial direction between the peak of the hill part 11*c* and the peak of the valley part 11*b*.

The thickness of the intermediate foil piece 10*a* is less than that of the back foil piece 11*a*. The rigidity of the intermediate foil 10 is less than half that of the back foil 11. As shown in FIG. 6, the intermediate foil piece 10*a* is provided with notches 27 (second notches) at the edges of two ends thereof in the axial direction. The notches 27 are provided in the recess 10*c* of the intermediate foil piece 10*a*. The notch 27 is formed at a position in the circumferential direction between two ends of the intermediate foil piece 10*a* in the circumferential direction (in the present disclosure, at a center position of the intermediate toil piece 10*a* in the circumferential direction). That is, the edges of two ends in the axial direction of the intermediate foil piece 10*a* are each provided with a depression in the axial direction at the above position in the circumferential direction.

The notch 27 of the present disclosure is formed by cutting out part of the bottom portion of the recess 10*c* formed between the flat portions 10*b*, toward the center of the intermediate foil piece 10*a* in the axial direction. The notch 27 is formed at a position corresponding to the engagement groove 25 of the bearing housing 12 and the notch 26 of the back foil piece 11*a*, namely, at a position overlapping the engagement groove 25 and the notch 26 in the circumferential direction. In other words, the notch 27 is disposed at an equivalent position to the engagement groove 25 and the notch 26 in the axial direction and the circumferential direction. The width of the notch 27 (the width in the circumferential direction) is formed to be less than the width of the engagement groove 25 (the width in the circumferential direction) and to be equal to the width of the notch 26 (the width in the circumferential direction). The engagement member 30 engages in the engagement groove 25, the notch 26 and the notch 27.

Figure 8:
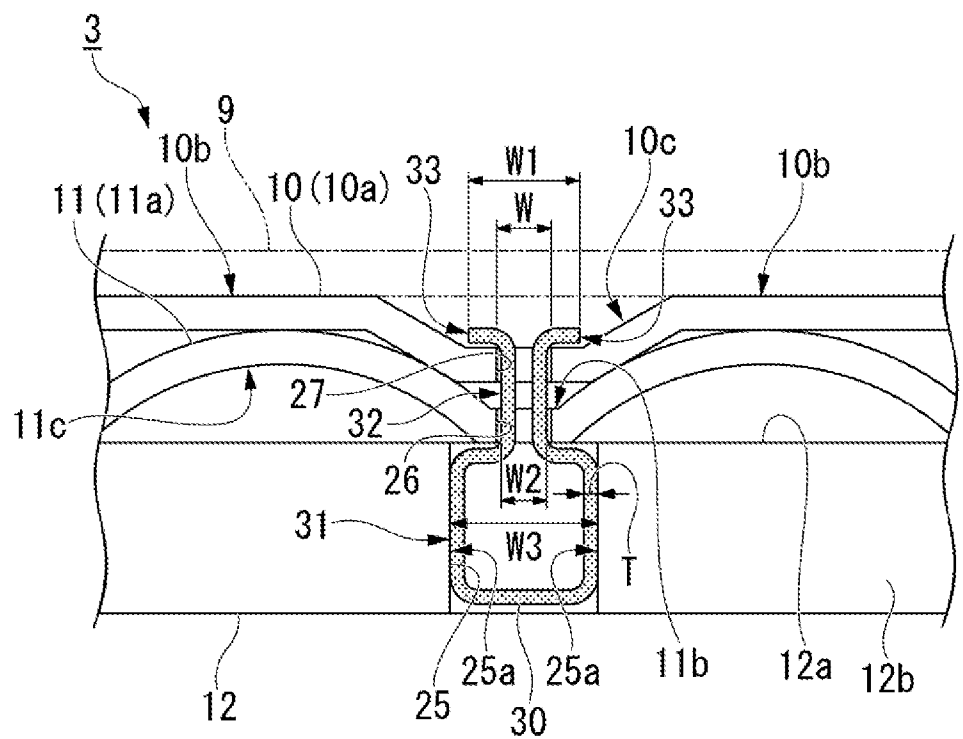
FIG. 8 is an enlarged front view of an engagement member of the present disclosure.

FIG. 8 is an enlarged front view of the engagement member 30 of the present disclosure.

As shown in FIG. 8, the engagement member 30 is attached to the bearing housing 12, passes through the notch 26 and the notch 27, and extends to the outside of the formation area W of the notch 27 in the circumferential direction on the inner peripheral side (inside in the radial direction) of the intermediate foil 10 (the intermediate foil piece 10*a*) on which the engagement member 30 passed through the notch 27 is. The notch 27 of the present disclosure has the same formation area W as that of the notch 26 of the back foil 11 (the back foil piece 11*a*) in the circumferential direction, and thus it can be described that the engagement member 30 extends to the outside of the formation area W of the notch 26 in the circumferential direction. Note that the engagement member 30 of the present disclosure is configured of a single plate-shaped member.

In other words, the engagement member 30 is attached to the bearing housing 12 in a state of passing through the notch 26 and the notch 27 and extends to the outside of the formation area W of the notch 27 in the circumferential direction of the insertion hole 12*a* on the inner peripheral side (inside in the radial direction) of the intermediate foil 10 (the intermediate foil piece 10*a*).

Note that the engagement member 30 of this embodiment is a member different from each of the back foil 11 and the intermediate foil 10.

The engagement member 30 of this embodiment is an integrally formed member. That is, the engagement member 30 includes a first portion facing the surface on one side in the circumferential direction of the engagement groove 25, a second portion facing the surface on the other side in the circumferential direction of the engagement groove 25 and a third portion connecting the first portion and the second portion. Further, the engagement member 30 of this embodiment includes a constricted portion. That is, the engagement member 30 is provided with a portion whose width in the circumferential direction decreases from the inner peripheral side toward the outer peripheral side in the radial direction, and a portion whose width in the circumferential direction increases from the inner peripheral side toward the outer peripheral side in the radial direction, and the above constricted portion is formed by these portions. In this embodiment, the notch 26 and the notch 27 are disposed at, positions corresponding to the constricted portion of the engagement member 30 in the radial direction.

The engagement member 30 includes an engagement part 31 engaging in the engagement groove 25 of the bearing housing 12, insertion parts 32 inserted through (or fitted into) the notch 26 and the notch 27, and return parts 33 facing the inner peripheral side of the intermediate foil 10 (the back foil 11). The engagement part 31 contacts inner surfaces 25*a* at two ends in the circumferential direction of the engagement groove 25. The inner surfaces 25*a* of the engagement groove 25 face each other with a space in the circumferential direction and extend to be parallel to the radial direction. The engagement part 31 is formed in a rectangular frame shape that contacts the inner surfaces 25*a* of the engagement groove 25 with a predetermined width in the radial direction. An area forming a space in the circumferential direction is provided between a portion on one side in the circumferential direction of the engagement part 31 facing one inner surface 25*a* and a portion on the other side in the circumferential direction of the engagement part 31 facing another inner surface 25*a*. The engagement part 31 is smoothly separated from the inner surface 25*a* by providing an R (curved shape) or the like. That is, the corner of the rectangular frame of the engagement part 31 has a curved shape.

The insertion parts 32 extend from the upper part of the rectangular frame-shaped engagement part 31 inward in the radial direction in parallel. Two insertion parts 32 are provided extending, from the engagement part 31 and are apart from each other. The insertion part 32 and the engagement part 31 are smoothly connected by providing an R (curved shape) or the like. The insertion part 32 contacts the intermediate foil piece 10*a* and the back foil piece 11*a* in the axial direction. The return parts 33 are formed by being bent in directions away from each other in the circumferential direction from the distal ends of the insertion parts 32 extending in parallel inward in the radial direction.

That is, the engagement member 30 includes a pair of return parts 33 that extend in directions away from each other in the circumferential direction. The pair of the return parts 33 are accommodated in the recess 10*c* of the intermediate foil 10, and the pair of the return parts 33 are positioned outward in the radial direction relative to the opening position (the upper end, the inner end in the radial direction) of the recess 10*c*.

In other words, the engagement member of the present disclosure may be configured of an engagement part attached to the hearing housing 12, an insertion part that is connected to the engagement part, passes through the notch 26 and the notch 27 and is disposed therein, and a return pan that is connected to the insertion part, protrudes to at least one side in the circumferential direction and extends to the outside of the formation area W of the notch 27.

The engagement member 30 of the present disclosure extends on an area wider than the formation area W of the notch 27 (the notch 26) on the inner peripheral side (a surface on the inside in the circumferential direction) of the intermediate foil 10 (the back foil 11). Specifically, when the width between two ends of a pair of return parts 33 extending in opposite directions is represented by W1, the relationship of W1>W holds. When the width of the insertion part 32 (the width in the circumferential direction) is represented by W2, the relationship of W1>W>W2 holds. When the width of the engagement part 31 (the width in the circumferential direction) is represented by W3, the relationship of W3>W1>W>W2 holds. Note that W3 may be less than W1. W1 extends on an area wider than the valley part 11*b* of the back foil 11. The engagement member 30 does not protrude inward in the radial direction from the flat portion 10*b*. Further, when the thickness of the plate member of the engagement member 30 is represented by T, W1−W2+2T>W2 holds.

The engagement member 30 contacts the inner surfaces 25*a* of the engagement groove 25 in an accumulated state. The engagement member 30 of the present disclosure is formed by bending one leaf spring (elastic member) into a substantially C-shape (bottle shape). The engagement part 31 of the engagement member 30 engages in the engagement groove 25 in a state of slightly compressed in the circumferential direction. Thereby, a spring-back that opens the engagement part 31 in the circumferential direction acts on the engagement part 31. Therefore, a frictional force occurs between the engagement part 31 and the inner surface 25*a* of the engagement groove 25, and the engagement member 30 is held in the bearing housing 12. Note that the "accumulated state" in the present disclosure refers to an elastically compressed state.

Returning to FIG. 3, the cover 50 is attached to each of two end surfaces 12*b* in the axial direction of the hearing housing 12. The cover 50 covers at least part of the engagement groove 25 that accommodates the engagement part 31 of the engagement member 30. The cover 50 faces at least part of the engagement part 31 in the axial direction. The cover 50 of the present disclosure is formed in a circular annular plate shape in the circumferential direction of the bearing housing 12. The diameter of the inner peripheral edge of the cover 50 is greater than the diameter of the inner peripheral edge of the bearing housing 12, and the diameter of the outer peripheral edge of the cover 50 is less than the diameter of the outer peripheral edge of the bearing housing 12.

The cover 50 is fixed by screws 51 screwed into screw holes 52 (see FIG. 2) formed in the bearing housing 12 in the vicinities of the engagement grooves 25. The cover 50 of the present disclosure is screwed at positions that divide the end surface 12*b* of the bearing housing 12 into substantially three in the circumferential direction. According to the above configuration, since the cover 50 covering the engagement groove 25 accommodating the engagement member 30 is attached to the end surface 12*b* of the bearing housing 12, the engagement member 30 can be prevented from detaching from the bearing housing 12 in the axial direction. Note that the method of attaching the cover 50 to the bearing housing 12 is not particularly limited.

Next, the operation of the radial foil bearing 3 having the above configuration will be described.

In a state where the rotary shaft 1 stops, the top foil 9 is pushed onto the rotary shaft 1 via the intermediate foil 10 (three intermediate foil pieces 10*a*) by the back foil 11 (three back foil pieces 11*a*) and thus closely contacts the rotary shaft 1. Note that in this embodiment, since two end portions of the top foil 9 have the thin portions 24, at the thin portions 24, a force (local preload) for clamping the rotary shaft 1 is moderated compared to a case without the thin portions 24.

Then, when the rotary shaft 1 is started in the direction of the arrow P in FIG. 2, the rotary shaft 1 starts rotating at a low speed at first and then gradually accelerates to rotate at a high speed. Then, as shown by the arrow Q in FIG. 2, an ambient fluid is drawn from one end side of each of the top foil 9, the intermediate foil 10 and the back foil 11 and flows into a space between the top foil 9 and the rotary shaft 1. Thereby, a fluid lubricating film is formed between the top foil 9 and the rotary shaft 1.

The film pressure of the fluid lubricating film acts on the top foil 9 and presses each hill part 11*c* of the back foil piece 11*a* via the intermediate foil 10 contacting the top foil 9. Then, when the back toil piece 11*a* is pressed by the intermediate foil 10, the hill part 11*c* is pressed and expanded, and thereby the back foil piece 11*a* starts moving on the bearing housing 12 in the circumferential direction. That is, since the back foil piece 11*a* (the back foil 11) elastically supports the top foil 9 via the intermediate foil 10, the back foil piece 11*a* deforms in the circumferential direction when receiving a load from the top foil 9 and thereby allows the flexure of the top foil 9 or the intermediate foil 10 and supports them.

Here, as shown in FIG. 8, the engagement member 30 is inserted through the notch 26 formed at an edge in the axial direction of the back foil piece 11*a*. The engagement member 30 engages in the engagement groove 25 of the bearing housing 12, and when the engagement member 30 is inserted through the notch 26, the rotation of the back foil piece 11*a* in the circumferential direction is prevented. Thus, each hill part 11*c* of the back foil piece 11*a* is deformed (moves) in the circumferential direction so as to be away from the notch 26 in which the engagement member 30 engages.

The insertion part 32 of the engagement member 30 contacts the back foil piece 11*a* and also prevents the movement of the back foil piece 11*a* in the axial direction. Further, as shown in FIG. 8, the engagement member 30 extends to the outside of the formation area W of the notch

26 in the circumferential direction of the insertion hole 12*a* on the inner peripheral side of the back foil 11 on which the engagement member 30 passed through the notch 26 is. That is, the return part 33 is provided in the engagement member 30 on the inner peripheral side of the back foil 11 on which the engagement member 30 passed through the notch 26 is and becomes a retainer for the back foil piece 11*a* in the radial direction. Therefore, the detachment of the back foil piece 11*a* is prevented.

The intermediate foil piece 10*a* is provided with the notch 27 through which the engagement member 30 is inserted, similarly to the back foil piece 11*a*. Therefore, the intermediate foil piece 10*a* is also prevented from detaching. The intermediate foil piece 10*a* bends together with the top foil 9 and the back foil piece 11*a* when transmitting a load from the top foil 9 to the back foil piece 11*a*, and at this time, "sliding" occurs between the intermediate foil piece 10*a* and the top foil 9 or the back foil piece 11*a*. That is, when a pressure fluctuation occurs in the fluid lubricating film due to the shaft vibration of the rotary shaft 1, the pressure fluctuation is transmitted to the top foil 9, and the "sliding" occurs. This "sliding" causes energy dissipation due to friction and damps the film pressure fluctuation, so that the shaft vibration of the rotary shaft 1 is limited.

Moreover, when the fluctuating load (repetition of loading and unloading) due to the shaft vibration of the rotary shaft 1 acts on the back foil piece 11*a* and the load becomes being unloaded, the back foil piece 11*a* slightly lifts off the inner peripheral surface of the insertion hole 12*a* of the bearing housing 12. At this time, the return part 33 of the engagement member 30 is caught by the back foil piece 11*a* (the intermediate foil piece 10*a*), and the engagement member 30 is lifted together with the back foil piece 11*a*. Here, since the engagement member 30 contacts the inner surfaces 25*a* of the engagement groove 25 of the bearing housing 12, "sliding" occurs between the engagement member 30 and the inner surfaces 25*a* of the engagement groove 25, causes energy dissipation due to friction and contributes as damping.

In this way, according to this embodiment described above, a configuration is adopted including the bearing housing 12 provided with the insertion hole 12*a*; the back foil 11 disposed on the inner peripheral surface of the insertion hole 12*a*, the notch 26 being provided at an edge of the back foil 11 in the axial direction in which the insertion hole 12*a* extends; and the engagement member 30 attached to the bearing housing 12, passing through the notch 26, and extending to the outside of the formation area W of the notch 26 in the circumferential direction of the insertion hole 12*a* on the inner peripheral side of the back foil 11 on which the engagement member 30 passed through the notch 26 is, whereby the back foil 11 can be prevented from detaching from the bearing housing 12.

Hereinbefore, although one embodiment of the present disclosure has been described with reference to the drawings, the present disclosure is not limited to the above embodiment. The shapes, combinations and the like of the components described in the above embodiment are merely examples, and various modifications of the configuration can be adopted based on design requirements and the like within the scope of the present disclosure.

For example, as the engagement member 30, modifications as shown in FIGS. 9 to 12 can be adopted. In the following description, the same or equal component as or to that of the above embodiment is attached with an equal reference sign, and the explanation thereof will be simplified or omitted.

Figure 9:
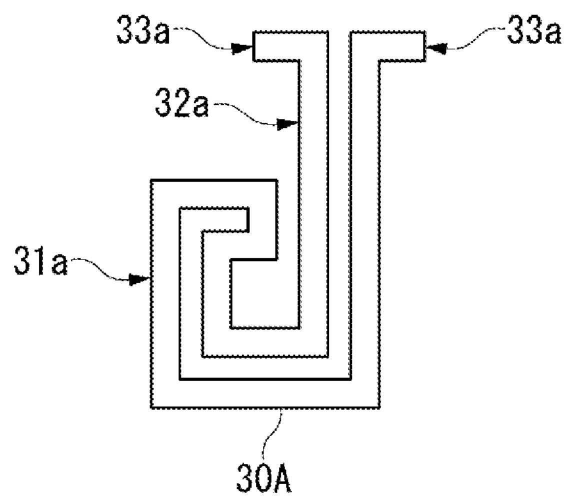
FIG. 9 is a front view showing a modification of the engagement member of the present disclosure.

An engagement member 30A shown in FIG. 9 has a configuration in which one leaf spring is folded in two and then the fold side thereof is wound. The engagement member 30A includes an engagement part 31*a* whose external shape is wound in a square shape (as viewed in the axial direction of the insertion hole 12*a*), a pair of insertion parts 32*a* extending from one corner of the engagement part 31*a*, and a pair of return parts 33*a* bent in opposite directions from the distal ends of the pair of the insertion parts 32*a*. In this modification, an area that becomes a gap in the circumferential direction is provided between a portion of the engagement member 30A contacting an inner surface 25*a* on one side in the circumferential direction of the engagement groove 25 and another portion of the engagement member 30A contacting an inner surface 25*a* on the other side in the circumferential direction of the engagement groove 25. Moreover, outer sides in the radial direction of the above portions are connected, and inner sides in the radial direction of the above portions are apart from each other. That is, in a cross-section orthogonal to the axial direction, an inner side in the radial direction of the area that becomes the gap is opened. Further, the distal end of the above folded portion in two is bent, extends inward in the radial direction, and approaches the insertion part 32*a*. According to this configuration, since the engagement part 31*a* is wound double, the spring-back against the inner surface 25*a* of the engagement groove 25 can be increased as compared to that in the above embodiment. Thai is, the pressing force of the engagement part 31*a* disposed in the engagement groove 25 in an elastically compressed state against the inner surface of the engagement groove 25 can be improved as compared to the above embodiment.

Figure 10:
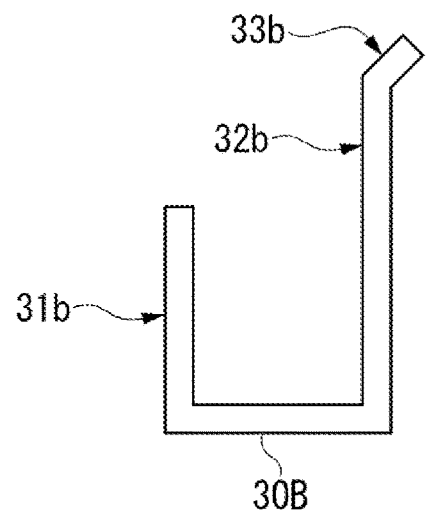
FIG. 10 is a front view showing a modification of the engagement member of the present disclosure.

An engagement member 30B shown in FIG. 10 has a configuration in which one leaf spring is formed without being folded in two. The engagement member 30B includes an engagement part 31*b* obtained by bending a plate into a square shape (or U-shape), an insertion part 32*b* without plates overlapping each other in the circumferential direction, and a return part 33*b* bent outward in the circumferential direction from the distal end of the insertion part 32*b*. That is, in the engagement member 30B of this modification, an area that becomes a gap in the circumferential direction is also provided between a portion of the engagement member 30B contacting an inner surface 25*a* on one side in the circumferential direction of the engagement groove 25 and another portion of the engagement member 30B contacting an inner surface 25*a* on the other side in the circumferential direction of the engagement groove 25. Moreover, outer sides in the radial direction of the above portions are connected, and inner sides in the radial direction of the above portions are apart from each other. That is, in a cross-section orthogonal to the axial direction, an inner side in the radial direction of the area that becomes the gap is opened. Further, the return part 33*b* extends from a position on the inner side in the radial direction of the insertion part 32*b* in a direction with an obtuse angle with respect to another direction extending inward from outside in the radial direction of the insertion part 32*b*. According to this configuration, the number of the return part 33 is one.

That is, the engagement member of the present disclosure may have a configuration in which the engagement member is attached to the bearing housing 12 in a state of passing through the notch 26 and the notch 27 and extends only toward one side in the circumferential direction of the insertion hole 12*a* on the inner peripheral side of the intermediate foil 10 (the intermediate foil piece 10*a*). For example, although a pair of return parts 33 are used for the above embodiment, a configuration may be adopted in which only one return part 33 is provided.

Figure 11:
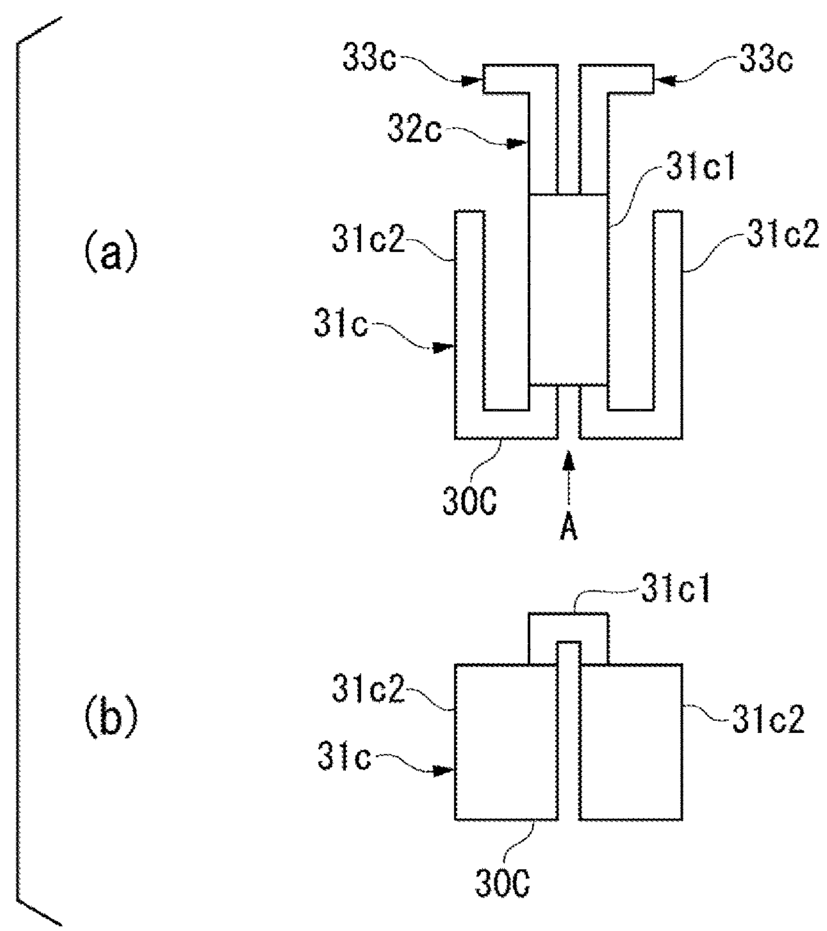
FIG. 11 is a schematic diagram showing a modification of the engagement member of the present disclosure, the part (a) thereof is a front view, and the part (b) thereof is a bottom view.

An engagement member 30C shown in the part (a) of FIG. 11 has a configuration in which one H-shaped leaf spring is bent. The part (b) of FIG. 11 is a view (bottom view) viewed in the direction of the arrow A in the part (a) of FIG. 11. The engagement member 30C includes an engagement part 31*c* provided with folded parts 31*c*1 and 31*c*2, a pair of insertion parts 32*c* extending upward (inward in the radial direction) from the engagement part 31*c*, and a pair of return parts 33*c* bent in opposite directions from the distal ends of the pair of insertion parts 32*c*. That is, the engagement member 30C of this modification includes the return parts 33*c* and portions extending from the return parts 33*c* outward in the radial direction. In addition, it includes portions extending in directions away from each other in the circumferential direction from the above portions extending outward in the radial direction. Further, it includes portions extending inward in the radial direction from positions, close to the inner surfaces 25*a* of the engagement groove 25, of the above portions extending in directions away from each other in the circumferential direction. The above portions extending inward in the radial direction from the positions close to the inner surfaces 25*a* terminate on inner side in the radial direction. One sides in the axial direction of the portions extending from the return parts 33*c* outward in the radial direction are connected to each other in the circumferential direction. The folded part 31*c*1 is a folded part of the H-shaped leaf spring in the left-right direction. The folded parts 31*c*2 are folded parts of two legs of the H-shaped leaf spring. According to this configuration, spring-back in two directions by the folded parts 31*c*1 and 31*c*2 occurs at the engagement part 31.

Figure 12:
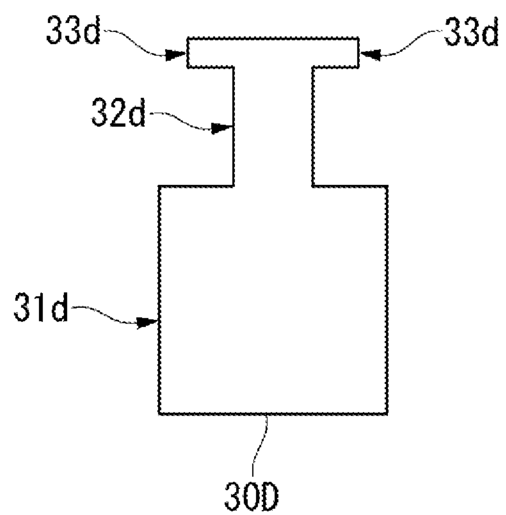
FIG. 12 is a front view showing a modification of the engagement member of the present disclosure.

An engagement member 30D shown in FIG. 12 has a configuration of being cut out from one leaf spring. The engagement member 30D includes a square solid engagement part 31*d*, an insertion part 32*d* extending from the upper part (inner end in the radial direction) of the engagement part 31*d*, and a pair of return parts 33*d* extending in opposite directions from the distal end of the insertion part 32*d*. According to this configuration, since the engagement member 30D can be formed by press working or the like, the engagement member 30D can be easily manufactured.

For example, in the above embodiment, a configuration is exemplified in which the width of the engagement part 31 (the width in the circumferential direction) is greater than the width of the insertion part 32 (the width in the circumferential direction). However, a T-shaped engagement member 30 may be adopted in which the width of the engagement part 31 (the width in the circumferential direction) is the same as the width of the insertion part 32 (the width in the circumferential direction).

In the above embodiment, the radial foil bearing 3 including the intermediate foil 10 is exemplified. However, a configuration may be adopted in which no intermediate foil 10 is provided, and the engagement member 30 is caught only by the back foil 11.

That is, in a case where no intermediate foil is provided, the engagement member of the present disclosure may be attached to the bearing housing 12 in a state of passing through the notch 26 and may extend to the outside of the formation area of the notch 26 in the circumferential direction of the insertion hole 12*a* on the inner peripheral side (inner side in the radial direction) of the back foil 11 (the back foil piece 11*a*). In this case, a configuration may be adopted in which the return part of the engagement member is accommodated in the valley part 11*b* of the back foil 11 or is disposed only in an area corresponding to the valley part 11*b* in the circumferential direction.

In other words, in a case where no intermediate foil is provided, the engagement member of the present disclosure may be configured of an engagement part attached to the bearing housing 12, an insertion part connected to the engagement part and disposed to pass through the notch 26, and a return part connected to the insertion part, protruding toward at least one side in the circumferential direction, and extending to the outside of the formation area of the notch 26.

In the above embodiment, the radial foil bearing 3 including cover 50 is exemplified. However, for example, in a case where the inner surface 25*a* of the engagement groove 25 is provided with a dovetail groove or the like that prevents the engagement member 30 from detaching in the axial direction, the cover 50 may not be provided.

For example, the inner surface 25*a* of the engagement groove 25 may be applied with a coating that adjusts friction. A copper coating can be used for this coating.

In the above embodiment, for example, as shown in FIG. 2, a configuration is exemplified in which two end surfaces 12*b* in the axial direction of the bearing housing 12 are provided with a pair of engagement grooves 25 extending outward in the radial direction from the inner peripheral edge of the insertion hole 12*a*, but a configuration may be adopted in which the engagement groove 25 is provided only in the end surface 12*b* on one side in the axial direction of the bearing housing 12. In addition, a configuration may be adopted in which the cover 50 is attached only to the end surface 12*b* on the one side.

That is, as long as the back foil 11 and the intermediate foil 10 can be appropriately held, a configuration may be adopted in which the notch 26 of the back foil 11, the notch 27 of the intermediate foil 10, and the engagement member 30 are provided only on one side in the axial direction and are not provided on the other side.

INDUSTRIAL APPLICABILITY

The present disclosure can be applied to a radial foil bearing that encircles and supports a rotary shaft.

What is claimed is:

1. A radial foil bearing, comprising:

a housing provided with an insertion hole;

a back foil disposed on an inner peripheral surface of the insertion hole, a first notch being provided at an edge of the back foil in an axial direction in which the insertion hole extends;

an intermediate foil supported by the back foil, a second notch being provided at an edge of the intermediate foil in the axial direction; and an engagement member attached to the housing, the engagement member passing through the first notch and the second notch, extending to outside of a formation area of the first notch in a circumferential direction of the insertion hole on an inner peripheral side of the back foil, and extending to outside of a formation area of the second notch in the circumferential direction of the insertion hole on an inner peripheral side of the intermediate foil.

2. The radial foil bearing according to claim 1, wherein the engagement member extends toward two sides in the circumferential direction of the formation area of the first notch on the inner peripheral side of the back foil.

3. The radial foil bearing according to claim 1, wherein an engagement groove extending outward in a radial direction from an inner peripheral edge of the insertion hole is provided on an end surface in the axial direction of the housing, and the engagement member contacts an inner surface of the engagement groove.

4. The radial foil bearing according to claim 3, wherein the engagement member is elastically compressed and inserted between two inner surfaces of the engagement groove facing each other.

5. The radial foil bearing according to claim 3, further comprising a cover attached to the end surface in the axial direction of the housing and covering the engagement groove accommodating the engagement member.

* * * * *